Oct. 13, 1925.
R. M. LOVEJOY
SHOCK ABSORBER
Filed Nov. 28, 1921
1,557,299
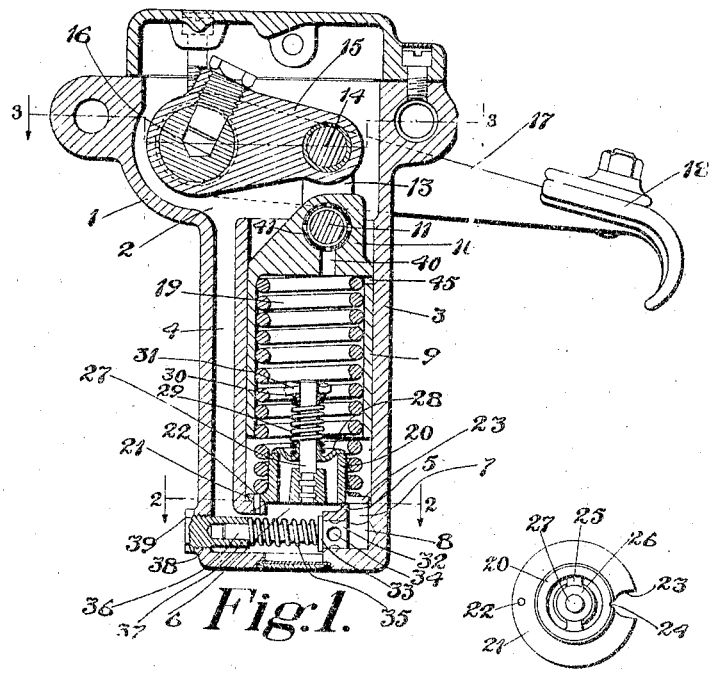
Fig. 1.
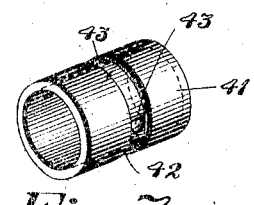
Fig. 7.
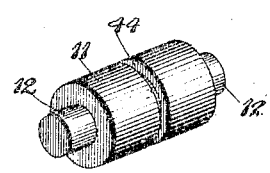
Fig. 6.
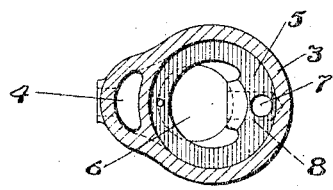
Fig. 2.
Fig. 4.
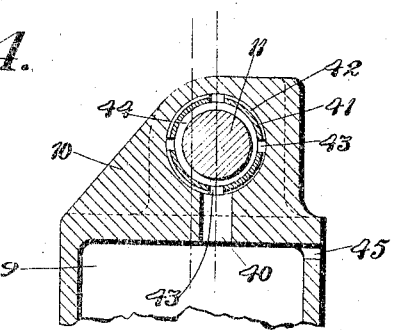
Fig. 5.
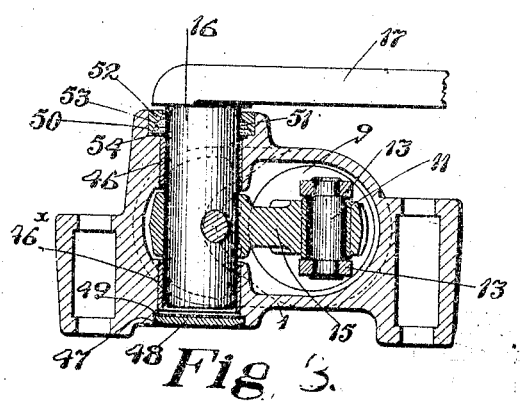
Fig. 3.
Inventor—
Ralph M. Lovejoy.
By— Heard Smith Tennant
Attorneys.

Patented Oct. 13, 1925.

1,557,299

UNITED STATES PATENT OFFICE.

RALPH M. LOVEJOY, OF MEREDITH, NEW HAMPSHIRE.

SHOCK ABSORBER.

Application filed November 28, 1921. Serial No. 518,120.

*To all whom it may concern:*

Be it known that I, RALPH M. LOVEJOY, a citizen of the United States, and resident of Meredith, county of Belknap, State of New Hampshire, have invented an Improvement in Shock Absorbers, of which the following description, in connection with the accompanying drawing, is a specification, like characters on the drawing representing like parts.

This invention relates to improvements in shock absorbers for cushioning the movement of two relatively movable members comprising a casing adapted to be secured to one of said members presenting a reservoir and a cylinder having a piston reciprocable therein and means for connecting the piston to the other relatively movable member.

One of the objects of the invention is to provide novel means for permitting a relatively free flow of liquid from the reservoir into the cylinder upon movement of the piston in one direction and for restricting the flow of liquid from the cylinder to the reservoir upon movement of the piston in the opposite direction. In this construction preferably a tubular piston is employed.

Another object of the invention is to provide novel means to vent air which may accumulate in the cylinder beneath the piston head.

A further object of the invention is to provide an improved bearing for the pivotal connection of the piston to the mechanism by which it is reciprocated.

A further object of the invention is to provide a novel means for lubricating this bearing which is also adapted to provide a vent for any air or gases which may accumulate beneath the piston head, the construction being such that the air or gases may be liberated without causing a foaming of the liquid in the reservoir.

More particularly the present invention contemplates certain improvements upon the construction disclosed in my prior Patent No. 1,324,913, granted December 16, 1919.

A further object of the invention is to provide a shock absorber of relatively smaller construction than that disclosed in my prior patent. This is accomplished by providing the cylinder wall with a conduit of relatively small cross sectional area, preferably extending in parallelism with the axis of the conduit and extending beneath the head of the cylinder and communicating with said cylinder head through a suitable port or ports.

A further object of the invention is to provide a shock absorber of the character described which comprises a rock shaft having an exterior arm adapted to be connected to one of the movable members and an interior arm connected to the piston with a novel type of bearing which will effectively prevent the escape of liquid from the reservoir.

These and other objects and features of the invention will more fully appear from the following description and the accompanying drawing and will be pointed out in the claims.

In the drawing:

Fig. 1 is a vertical longitudinal sectional view through the shock absorber casing and the mechanism therein contained;

Fig. 2 is a horizontal sectional view on line 2—2, Fig. 1, looking downwardly;

Fig. 3 is a horizontal sectional view on the broken line 3—3, Fig. 1, looking downwardly;

Fig. 4 is a detail plan view of the valve cage for the inlet valve;

Fig. 5 is a detail vertical sectional view through the head and upper portion of the tubular piston;

Fig. 6 is a perspective view of the shaft which is mounted in the piston head and connected to the arm of a rock shaft which is actuated by one of the relatively movable members; and, Fig. 7 is a perspective view of a tubular bushing which is interposed between the shaft, illustrated in Fig. 6, and the journal in the piston head in which said shaft is mounted.

The present invention is illustrated herein as applied to a shock absorber of the type disclosed in my prior patent aforesaid, but it will be understood that many of the features of the invention may be employed in other forms of shock absorbers and in other relations within the meaning and scope of the claims.

The shock absorber illustrated in the accompanying drawing comprises a casing 1 having a chamber 2 forming a reservoir for a liquid, such as oil, and provided with a downwardly extending cylinder 3, preferably formed integral with the casing. A conduit 4, which preferably is formed in the wall of the casing and is of relatively small cross sectional area compared with that of the cylinder, extends in parallelism with the axis of the cylinder and communicates at its upper end with the reservoir. At its lower end the conduit 4 extends laterally beneath the head 5 of the cylinder and forms a relatively large chamber below the cylinder head.

An inlet port 6, in the head 5 of the cylinder, communicates with the conduit. Preferably an outlet port is also provided in the cylinder head to communicate with the conduit. In the particular construction illustrated herein a port 7 is drilled downwardly through the head of the cylinder and communicates with a transverse hole 8 which is drilled in the lower part of the casing beneath the cylinder head at right angles to the port 7. The drilled hole 8 forms a port which communicates with the chamber which forms the lower portion of the conduit 4.

A piston 9, preferably tubular in form, is reciprocably mounted in the cylinder and its head is provided with an upwardly extending boss 10 providing a journal for a shaft 11, the preferably reduced ends 12 of which are connected to the lower ends of links 13, the upper ends of which are connected to a shaft 14 journalled in the end of an interior arm 15 of a rock shaft 16 which is journalled in suitable bearings in the casing and provided with an exterior arm 17 having at its free end a clamp 18 by means of which it is connected to a preferably flexible member which in turn is connected to one of the movable members, the movement of which is to be cushioned.

This shock absorber construction, like that disclosed in my prior patent aforesaid, is particularly adapted for use upon automobiles and other vehicles for cushioning the rebound of the springs, the casing being connected to the frame of the automobile or vehicle, and the arm 17 of the rock shaft to the axle of the vehicle.

A helical spring 19, preferably located within the tubular piston and seated at its lower end upon the head of the cylinder, serves normally to raise the piston and thereby to raise the arm 17 and thus maintain taut the flexible connection between the arm 17 and the movable member to which it is attached, such as the axle of a vehicle.

In the operation of the device a relative movement of the movable members toward each other tends to slacken the flexible connection between the arm 17 and the member to which it is connected. The spring 19 thereupon raises the piston, thus maintaining said flexible member taut. When the movable members move in the opposite direction or apart, as caused by the rebound of the springs of a vehicle, the arm 17 is moved downwardly, thus causing the piston to move downwardly. As the shock absorbers are designed to cushion the rebounding movement of the springs means are provided for freely admitting the liquid from the reservoir into the cylinder as the piston is raised, and for restricting or impeding the flow of the liquid from the cylinder to the reservoir during the downward movement of the piston and of the arm to which it is connected. In the present construction the liquid is permitted to flow freely into the cylinder through an inlet valve which, as illustrated herein, is located in the head of the cylinder, but which may be otherwise located, as for example, in the piston head itself.

In the particular construction illustrated in Figs. 1 to 4, a cylindrical valve cage 20, having an annular base flange 21, is seated upon the head of the cylinder surrounding the port 6 and is held from relative movement by a pin 22 extending through said flange into a suitable hole in the cylinder head. The lower end of the spring 9, which serves to elevate the piston, preferably rests upon the flange 21 of the valve cage and holds it upon its seat.

The flange 21 of the valve cage is provided with a recess 23 which registers with the drilled hole 7 which communicates with the port leading to the conduit 4. Preferably a groove 24 is provided in the wall of the base of recess 23 of the flange 21 to prevent collapsing of the spring from shutting off the flow of liquid into the drilled hole 7 which communicates through the hole 8 with the lower end of the conduit 4.

The valve cage 20 is provided with a spider 25 having a hub 26 in which a stem 27 is mounted. A valve 28, which may be of pressed sheet metal, is slidably mounted upon this stem and is held normally seated upon the upper end of the valve cage 20 by a light helical spring 29 which abuts at its upper end against a washer 30 held in place by a cotter pin 31, or other suitable fastening, secured to the stem 27.

Upon upward movement of the piston this valve readily yields and permits a substantially free flow of liquid from the conduit 4 into the cylinder. As soon as the upward movement of the piston ceases the spring 29 seats the valve upon the upper end of the valve cage, thus closing the port 6 against any downward flow of the liquid.

The flow of the liquid from the cylinder into the conduit is impeded or restricted by a valve located in the drilled hole 8 which constitutes the delivery port of the cylinder. The preferred form of valve which is illustrated herein preferably is of tubular construction, similar to that illustrated in my prior patent aforesaid. As illustrated herein the valve comprises a tubular head 32 which extends into the drilled hole 8 which forms the outlet port of the cylinder, a flange 33 upon said head serving to limit the movement of the tubular portion of the valve.

This tubular valve head is provided with one or more ports 34 which, when the valve is seated, are enclosed by the wall of the drilled hole 8. The valve is held in its seat by a helical spring 35 which surrounds the valve stem 36 and abuts at one end against the flange 33 and at its opposite end against the end of the tubular plug 37 which is located diametrically opposite to the delivery port 8 and is provided with a central aperture which receives and forms a guide for the valve stem 36. The plug 37 is provided with a screw threaded portion 38 which engages complementary walls in the casing and also is provided with a squared head 39 adapted to be engaged by a wrench for the purpose of removing and replacing the valve.

It will be noted that the valve stem extends across the chamber below the cylinder head which provides ample room for the valve spring, while the entire valve mechanism is conveniently housed within the chamber of the casing below the cylinder head and avoiding the necessity of any projection from the outside of the casing which otherwise would be necessary to accommodate the valve stem.

In the operation of the device the downward movement of the piston may cause sufficient pressure upon the head of the valve to force the valve rearwardly against the action of the spring 35 until more or less of the ports 34 pass beyond the end of the wall of the port 8 thereby permitting the liquid to flow into the conduit 4 which returns it to the reservoir. Inasmuch as this valve is relatively small and is held in its seat by a suitable spring any desired resistance to the flow of the liquid from the cylinder into the conduit may be established.

The present construction differs from that disclosed in my prior patent in that the outlet or relief valve is located below the head of the cylinder so that a very much smaller casing may be employed and, furthermore, the present device requires a smaller amount of liquid than is necessary in the construction disclosed in my prior patent.

While the action of the relief or outlet valve serves to cushion relatively large movements between the piston it is found desirable to provide additional means for assisting in the cushioning movement and particularly to cushion the relatively small movements between the movable members.

It is also found that where tubular pistons are employed in devices of this character more or less accumulation of air or gases is likely to take place beneath the head of the piston. Such accumulation of air and gas will seriously interfere with the proper operation of the shock absorber. In the present construction means have been provided to permit a restricted flow of the liquid from the upper portion of the cylinder and also to vent the gases which may accumulate within the tubular piston. In the present construction an aperture or duct 40 leads from the under face of the piston head to the bearing for the shaft 11 which, upon downward movement of the piston, enables a small amount of the liquid to flow upwardly through the duct 40 into the bearing of the shaft 11 from which it escapes into the reservoir beneath the surface of the liquid therein. The liquid and gases thus delivered are distributed over so great an area that foaming of the liquid in the reservoir is prevented.

In order to provide a more ample passage for the liquid which is forced through the duct into the bearing the journal in the head 10 of the piston is provided with a bushing 41 which is made of sufficiently small diameter to enable it to rotate within the aperture or journal in the head 10 of the piston. The bushing also is rotatable upon the shaft 11. The outer wall of the bushing preferably is provided with an annular channel 42 which communicates with the duct 40. Desirably, ports 43 extend through the bushing and communicate with the channel 42 so that liquid delivered through the duct 40 to the channel 42 may pass out lengthwise of the outer wall of the bushing and also may pass through the bushing and escape between the inner wall of the bushing and the outer wall of the cylinder. If desired the shaft 11 may also be provided with an annular groove or channel 44 to communicate with the ports 43 in the bushing, the channel 44 serving further to distribute the liquid peripherally about the shaft and thereby increase the freedom of its escape.

By thus providing a rotatable bushing for this bearing the wearing of the bushing and shaft is decreased to a minimum since the bushing will constantly rotate more or less at each reciprocation of the piston.

In some instances it may be desirable to provide other means for venting the air from beneath the piston head. This may be accomplished by providing a small hole or port 45 through the wall of the piston closely adjacent the under face of the head thereof so that air or gas which may accumulate may pass through the wall of the piston and escape between it and the wall of the cylinder. Inasmuch as the piston wall engages the cylinder wall with a running fit little, if any, of the liquid can pass through this port.

A further feature of the invention consists in connecting the end of the rock shaft arm 15 to the head of the piston at a distance beyond the axis of the piston. This not only enables a longer interior rock shaft arm 15 to be used than would otherwise be possible, but also enables the link 18 to act, at substantially all times, in parallelism with the axis of the piston, thus preventing wear upon the walls of the piston and cylinder which would occur if the links 18 were so located as to operate in lines oblique to the axis of the cylinder.

A further important improvement consists in providing means for preventing the escape of the liquid in the reservoir through the bearing for the rock shaft. A preferred construction for this purpose is illustrated in Fig. 3. The rock shaft 16 is mounted in suitable alined apertures which, for convenience of construction, extend entirely through opposite walls of the casing 1. These apertures are provided with rotatable bushings 46 and 46ˣ which fit tightly upon the shaft 16, but, of course, permit oscillation of the shaft. The end of the shaft 16 terminates short of the end of the casing upon one side and the wall of the aperture in this side of the casing is provided with a countersink 47 which is closed by a crowned disk of metal 48 which is placed in said countersink and afterward expanded. Desirably a thin packing 49 is interposed between the expanded disk 48 and the base of the countersink. Thus one of the apertures may be effectively sealed.

The effective sealing of the journal, through which the end of the rock shaft which is connected to the exterior arm 17 extends, presents a far more serious problem, particularly in view of the relatively small space which is available for a suitable packing, and this problem was only solved as a result of a great deal of experimentation.

In the preferred construction illustrated herein the wall of the casing 1 is provided with an annular countersink or recess 50 of considerably greater diameter than the diameter of the rock shaft and a packing of fibrous material is compressed by a suitable retainer in this recess both against the bottom of the recess and against the rock shaft 16. Preferably the packing comprises a series of compressed cork washers 51 which are retained in place and further compressed by a retaining ring 52 having an inner inclined face 53 which engages the periphery of the cork washers 51. The outer wall of the retaining ring 53 is provided with suitable means engaging the annular wall of the countersink or recess. A convenient and effective means consists in providing the annular retaining ring 52 with a knurled outer surface and in forcing the retaining ring into its seat under heavy pressure, such as hydraulic pressure.

Preferably a metallic washer 54 is interposed between the innermost cork washer and the end of the rotatable bushing, this washer being of greater external diameter than the diameter of the bushing 47. Thus the washer 54 presents a relatively wide area against which the cork packing may be compressed and prevents the packing from being forced between the outer wall of the bushing and the wall of the aperture in which it is seated. The free end of the rock shaft 16 desirably is rounded so that it may be inserted through the packed bushing after the latter has been assembled in the casing without shearing off any of the material of the cork washers. When the rock shaft is thus assembled in its bearings any lubricant which passes through the bushing will be absorbed by the cork washers and will tend to expand the same against the shaft so that the bearing is effectively sealed against the escape of liquid.

It will be understood that the embodiment of the invention disclosed herein is illustrative and not restrictive and that various modifications in form, construction and arrangement of parts may be made within the spirit and scope of the following claims.

Having thus described my invention, what I claim as new, and desire to secure by Letters Patent, is:

1. A shock absorber for cushioning the movement of two relatively movable members comprising a casing adapted to be secured to one of said relatively movable members presenting a reservoir for a liquid, a cylinder having an open end communicating with said reservoir and a head at the lower end located at a distance from the lower end of the casing and provided with an inlet port and with an outlet port, a conduit of relatively small diameter in the wall of said cylinder extending in parallelism with the axis thereof, communicating at its upper end with said reservoir and at its lower end extending below said cylinder head and communicating with said inlet and outlet ports, a piston reciprocable in said cylinder, means connecting said piston to the other relatively movable member, a valve in said inlet port operable when the piston is raised to permit liquid to flow freely from said conduit into said cylinder and a spring actuated valve for said outlet port, located below said cylinder head in said conduit, operable to restrict the flow of liquid from said cylinder into said conduit when the piston is moved downwardly.

2. A shock absorber casing comprising a reservoir, a cylinder extending downwardly therefrom having a head at its lower end, located at a distance from the lower end of said casing and provided with inlet and outlet ports and a conduit in the wall of said cylinder diametrically opposite to said outlet port communicating at its upper end with said reservoir and at its lower end extending beneath said cylinder head and communicating with the ports in said cylinder head, an inlet valve within said cylinder and a spring actuated relief valve enclosed within said conduit.

3. A shock absorber for cushioning the movement of two relatively movable members comprising a casing, adapted to be secured to one of said relatively movable members, presenting a reservoir for liquid and a cylinder, a tubular piston reciprocable in said cylinder, means operable upon movement of the piston in one direction to permit a substantially free flow of liquid from said reservoir to said cylinder, means for restricting the flow of liquid from said cylinder to said reservoir when the piston is moved in the opposite direction, means adapted to be connected to the other relatively movable member having a pivotal connection with the head of said piston and a duct in said piston head communicating with said cylinder and with the pivotal bearing for said piston operable to permit a restricted flow of liquid from said cylinder through the bearing of said pivotal connection and also to vent any air or gases which accumulate below the piston head.

4. A shock absorber for cushioning the movement of two relatively movable members comprising a casing, adapted to be secured to one of said relatively movable members, presenting a reservoir for liquid and a cylinder, a tubular piston reciprocable in said cylinder, means operable upon movement of the piston in one direction to permit a substantially free flow of liquid from said reservoir to said cylinder, means for restricting the flow of liquid from said cylinder to said reservoir when the piston is moved in the opposite direction, means adapted to be connected to the other relatively movable member having a pivotal connection with the head of said piston comprising a shaft journalled in the bearing in said piston head, a rotatable bushing in said bearing having an external channel and a duct in said cylinder head communicating with said cylinder and the channel in said bushing operable to permit a restricted flow of liquid from said cylinder through said bearing and also to vent any air or gases which may accumulate below the piston head.

5. A shock absorber for cushioning the movement of two relatively movable members comprising a casing, adapted to be secured to one of said relatively movable members, presenting a reservoir for liquid and a cylinder, a tubular piston reciprocable in said cylinder, means operable upon movement of the piston in one direction to permit a substantially free flow of liquid from said reservoir to said cylinder, means for restricting the flow of liquid from said cylinder to said reservoir when the piston is moved in the opposite direction, means adapted to be connected to the other relatively movable member having a pivotal connection with the head of said piston comprising a shaft journalled in a bearing in said piston head, a bushing rotatably mounted in said bearing having an external annular channel, ports leading from said channel through said bushing and a duct in said cylinder head communicating with said cylinder and with said channel operable to permit a restricted flow of liquid from said cylinder through said bearing internally and externally of said bushing and also to vent any air or gases which may accumulate below said piston head.

6. A shock absorber for cushioning the movement of two relatively movable members comprising a casing adapted to be connected to one of said relatively movable members presenting a reservoir for a liquid and a cylinder, a piston reciprocably mounted in said cylinder, means for establishing a free flow of liquid from said reservoir to said cylinder when the piston is moved in one direction, means to restrict the flow of liquid from said cylinder to said reservoir when the piston is moved in the opposite direction, a rock shaft journalled in said casing having an exterior arm adapted to be connected to the other relatively movable member and an interior arm within said casing, and means pivotally connecting the free end of said interior rock shaft arm to said piston beyond the axis of said piston.

7. A shock absorber for cushioning the movement of two relatively movable members comprising a casing adapted to be connected to one of said relatively movable members presenting a reservoir for a liquid and a cylinder, a piston reciprocably mounted in said cylinder, means for establishing a free flow of liquid from said reservoir to said cylinder when the piston is moved in one direction, means to restrict the flow of liquid from said cylinder to said reservoir when the piston is moved in the opposite direction, a rock shaft journalled in said casing having an exterior arm adapted to be connected to the other relatively movable member and an interior arm within said casing, links extending substantially in parallelism with the axis of the piston, pivotally connected to said interior rock shaft arm and to the head of the piston beyond the axis of said piston whereby a long interior arm may be employed and said links thereby caused to move substantially in parallelism with the axis of the piston.

8. A shock absorber for cushioning the movement of two relatively movable members comprising a casing adapted to be connected to one of said relatively movable members presenting a reservoir for a liquid and a cylinder, a piston reciprocably mounted in said cylinder, means for establishing a free flow of liquid from said reservoir to said cylinder when the piston is moved in one direction and means for restricting the flow of liquid from said cylinder to said reservoir when the piston is moved in the opposite direction, alined apertures in the upper portion of said casing, a rock shaft mounted in the upper portion of said casing having an exterior arm adapted to be connected to the other relatively movable member, and an interior arm connected to said piston, a bearing for said rock shaft adjacent said exterior arm comprising an annular recess of greater diameter than that of said rock shaft, a packing of homogeneous fibrous material in said recess and an annular retaining member forcibly fitting within said recess and having its periphery fixedly engaging the wall of said recess and having an inner inclined face engaging said packing acting to condense the same and force said packing toward said rock shaft.

9. A shock absorber for cushioning the movement of two relatively movable members comprising a casing adapted to be connected to one of said relatively movable members presenting a reservoir for a liquid and a cylinder, a piston reciprocably mounted in said cylinder, means for establishing a free flow of liquid from said reservoir to said cylinder when the piston is moved in one direction and means for restricting the flow of liquid from said cylinder to said reservoir when the piston is moved in the opposite direction, alined apertures in the upper portion of said casing, a rock shaft mounted in the upper portion of said casing having an exterior arm adapted to be connected to the other relatively movable member, and an interior arm connected to said piston, a bearing for said rock shaft adjacent said exterior arm comprising an annular recess of greater diameter than that of said rock shaft, a packing comprising a plurality of compressed cork washers in said recess, an annular retaining member engaging the wall of said recess and having an inner inclined face acting to compress said packing rings together and to force the same toward said shaft.

10. A shock absorber for cushioning the movement of two relatively movable members comprising a casing adapted to be connected to one of said relatively movable members presenting a reservoir for a liquid and a cylinder, a piston reciprocably mounted in said cylinder, means for establishing a free flow of liquid from said reservoir to said cylinder when the piston is moved in one direction and means for restricting the flow of liquid from said cylinder to said reservoir when the piston is moved in the opposite direction, alined apertures in the upper portion of said casing, a rock shaft mounted in the upper portion of said casing having an exterior arm adapted to be connected to the other relatively movable member, and an interior arm connected to said piston, a bearing for said rock shaft adjacent said exterior arm comprising an annular recess of greater diameter than that of said rock shaft, a packing comprising a plurality of compressed cork washers in said recess, an annular retaining member engaging the wall of said recess and having an inner inclined face acting to compress said packing rings together and to force the same toward said shaft, a rotatable bushing embracing said rock shaft and an annular washer of greater diameter than the bushing, interposed between said bushing and said fibrous material.

11. A shock absorber for cushioning the movement of two relatively movable members comprising a casing adapted to be connected to one of said relatively movable members presenting a reservoir for a liquid and a cylinder, a piston reciprocably mounted in said cylinder, means for establishing a free flow of liquid from said reservoir to said cylinder when the piston is moved in one direction and means for restricting the flow of liquid from said cylinder to said reservoir when the piston is moved in the opposite direction, alined apertures in the upper portion of said casing, a rock shaft mounted in the upper portion of said casing having an exterior arm adapted to be connected to the other relatively movable member, and an interior arm connected to said piston, a bearing for said rock shaft adjacent said exterior arm comprising an annular recess of greater diameter than that of said rock shaft, a packing of fibrous material in said recess and an annular retaining member engaging the wall of said recess and having an inner inclined face engaging said packing acting to condense the same and force said packing toward said rock shaft, and sealing means for closing the aperture in the opposite side of said casing beyond the end of said rock shaft.

12. A shock absorber for cushioning the movement of two relatively movable members comprising a casing adapted to be connected to one of said relatively movable members presenting a reservoir for a liquid and a cylinder, a piston reciprocably mounted in said cylinder, means for establishing a free flow of liquid from said reservoir to said cylinder when the piston is moved in one direction and means for restricting the flow of liquid from said cylinder to said reservoir when the piston is moved in the opposite direction, alined apertures in the upper portion of said casing, a rock shaft mounted in the upper portion of said casing having an exterior arm adapted to be connected to the other relatively movable member, and an interior arm connected to said piston, a bearing for said rock shaft adjacent said exterior arm comprising an annular recess of greater diameter than that of said rock shaft, a packing of fibrous material in said recess and an annular retaining member engaging the wall of said recess and having an inner inclined face engaging said packing acting to condense the same and force said packing toward said rock shaft, and sealing means for closing the aperture in the opposite side of said casing beyond the end of said rock shaft comprising a cylindrical countersink in said casing and an expanded metal disk seated at the base of said countersink.

13. A shock absorber for cushioning the movement of two relatively movable members comprising a casing adapted to be connected to one of said relatively movable members presenting a reservoir for a liquid and a cylinder, a tubular piston reciprocably mounted in said cylinder adapted to be connected to the other relatively movable member, means for establishing a free flow of liquid from said reservoir to said cylinder when the piston is moved in one direction and means for restricting the flow of liquid from said cylinder to said reservoir when the piston is moved in the opposite direction, and a vent port in the tubular wall of said piston, located adjacent the cylinder head, adapted to permit escape of air or gases which accumulate in said tubular piston beneath the head thereof.

14. A shock absorber for cushioning the movement of two relatively movable members comprising a casing, adapted to be secured to one of said relatively movable members, presenting a reservoir for a liquid and a cylinder, a piston reciprocable in said cylinder, means operable upon movement of the piston in one direction to permit a substantially free flow of liquid from said reservoir to said cylinder, means for restricting the flow of liquid from said cylinder to said reservoir when the piston is moved in the opposite direction, means, adapted to be connected to the other relatively movable member, having a pivotal connection with the head of said piston comprising a shaft journalled in a bearing in said piston head and a rotatable bushing in said bearing whereby the wearing of the bushing and shaft will be decreased to a minimum by reason of the creeping of the bushing.

15. A shock absorber for cushioning the movement of two relatively movable members comprising a casing, adapted to be secured to one of said relatively movable members, presenting a reservoir for a liquid and a cylinder, a piston reciprocable in said cylinder, means operable upon movement of the piston in one direction to permit a substantially free flow of liquid from said reservoir to said cylinder, means for restricting the flow of liquid from said cylinder to said reservoir when the piston is moved in the opposite direction, means, adapted to be connected to the other relatively movable member, having a pivotal connection with the head of said piston comprising a shaft journalled in a bearing in said piston head, a rotatable bushing in said bearing and a duct in said cylinder head communicating with said cylinder and the bearing in the piston head.

In testimony whereof, I have signed my name to this specification.

RALPH M. LOVEJOY.